United States Patent [19]

Francioni

[11] Patent Number: 4,862,673
[45] Date of Patent: Sep. 5, 1989

[54] ROTARY JAW ASSEMBLY FOR PACKAGING MACHINES, PARTICULARLY PACKAGING MACHINES FOR TUBULAR WRAPPERS OF THE FLOW-PACK OR SIMILAR TYPE

[75] Inventor: Renzo Francioni, Prato Sesia, Italy

[73] Assignee: Cavanna S.p.A., Prato Sesia, Italy

[21] Appl. No.: 141,107

[22] Filed: Jan. 4, 1988

[30] Foreign Application Priority Data

Apr. 28, 1987 [IT] Italy ................ 67358 A/87

[51] Int. Cl.⁴ .................. B65B 51/30; B65B 51/14; B65B 51/16
[52] U.S. Cl. ...................... 53/373; 53/550; 156/515; 156/582; 156/583.1
[58] Field of Search ............. 53/550, 551, 373, 552, 53/554, 555; 156/582, 515, 583.1

[56] References Cited

U.S. PATENT DOCUMENTS

| | | |
|---|---|---|
| 2,280,405 | 4/1942 | Frotad . |
| 2,951,325 | 9/1960 | Podlesak et al. ............ 53/550 X |
| 3,007,295 | 11/1961 | Heinzer . |
| 3,237,371 | 3/1966 | Gerlach ..................... 53/550 X |
| 3,241,288 | 3/1966 | Molins . |
| 3,629,987 | 12/1971 | Klopfenstein . |
| 3,738,081 | 6/1973 | Heinzer ..................... 53/550 |
| 3,850,780 | 11/1974 | Crawford et al. ............ 53/550 X |
| 4,249,364 | 2/1981 | Kawasaki et al. ............ 53/550 |
| 4,341,057 | 7/1982 | Limousin ..................... 53/373 X |
| 4,433,527 | 2/1984 | Ramsey et al. . |
| 4,455,808 | 6/1984 | Netzhammer ............... 53/373 |
| 4,517,790 | 5/1985 | Kraeger ..................... 53/373 X |

FOREIGN PATENT DOCUMENTS 0055211 6/1982 European Pat. Off. .
554260 9/1974 Switzerland .

Primary Examiner—Horace M. Culver
Attorney, Agent, or Firm—Christie, Parker & Hale

[57] ABSTRACT

The disclosure is directed to a heat-sealing jaw assembly for use in packaging machine. The heat-sealing jaws are of the type commonly referred to as "flying" heat-sealing jaws since they have a component of motion in the same direction as the motion of a package, or other workpiece, to be sealed. The heat-sealing jaws are also of the type commonly referred to as "rotary" heat-sealing jaws since each jaw rotates about an axis. In a preferred embodiment a pair of heat-sealing jaws is provided. One of the jaws rotates on a fixed axis while the other jaw rotates about an axis which moves in an arc having a radius centered on the fixed axis of the first jaw. The movement of the second jaw through the arc is provided by a pivoted support for the jaw axis.

14 Claims, 3 Drawing Sheets

ROTARY JAW ASSEMBLY FOR PACKAGING MACHINES, PARTICULARLY PACKAGING MACHINES FOR TUBULAR WRAPPERS OF THE FLOW-PACK OR SIMILAR TYPE

DESCRIPTION

1. Field of the Invention

The present invention relates to rotary jaw assemblies for packaging machines and particularly concerns a rotary jaw assembly including a pair of jaws which together define a transit zone for the packages and are each provided with at least one active member which rotates about a respective axis so as to cooperate with an active member of the other jaw to cause closure of the packages in a region between the two cooperating active members.

2. Background of the Invention

Jaw assemblies of the type specified above are well known in the art and currently used in packaging machines to carrying out closing and cutting operations on a continuous tubular wrapper in which the products to be wrapped are inserted at fixed intervals, in order to form single packages, each containing a product. With the use of such rotary jaws, it has been noticed that the quality of the sealing operation deteriorates gradually as the speed or frequency of operation of the machine increases.

In a more usual embodiment of use, in which the active members of the jaws carry associated heating elements for causing local fusion and consequent sealing of two portions of the tubular wrapper which are pressed against each other, it can immediately be seen that an increase in speed or frequency of operation of the rotary jaws brings consequent reduction of the time interval during which the active members of the cooperating jaws act on the wrapper to cause sealing.

In order to remedy to this problem it has been suggested in the past (see, for instance Swiss Patent 554,260) that the structure of the rotary jaws should be modified so that the active members, so to speak, follow for a certain interval of time the package which is advancing between the jaws, thus ensuring the qualitative success of the sealing operation. For example, it has been suggested that the active members of the two jaws should be mounted on guides which extend radially relative to the jaws so that, whilst orbiting about their respective axes of rotation, they are brought to bear against each other (with the interposition of the wrapper which is being closed and sealed) during the sealing operation, and thus move along a common chord of their paths of movement about their respective axes of rotation during the course of the sealing operation.

However, this solution encounters real difficulties, particularly with regard to the necessity of ensuring the electrical supply to the heating elements mounted on the active members, which must be able to move in a radial direction relative to the jaws. Another difficulty arises, for example, from the necessity of ensuring lubrication of the movement of the active members relative to the jaws. In fact, it should be mentioned that in typical sectors where packaging machines are used, such as the food or pharmaceutical sectors, there are serious limitations on the possibility of using lubricants in the zone traversed by the products being packaged.

SUMMARY OF THE INVENTION

The object of the present invention, therefore, is to provide a rotary jaw assembly for packaging machines which ensures a constant quality of operation but does not give rise to the aforesaid problems.

According to the present invention, this object is achieved by a rotary jaw assembly of the type described above, characterized in that at least one of the jaws has an associated pivoted support structure which can impart to the said one of the jaws a reciprocating orbital movement relative to the other jaw, so that the said one of the jaws can follow the region of the packages during their transit through the rotary jaw assembly.

Preferably, the at least one active member of the other jaw has a radius of rotation larger than the radius of rotation of the at least one active member of the said one of the jaws.

The use of a jaw (usually that situated in the lower position) with a larger radius than that of the other jaw has the basic purpose of avoiding the possibility of the part of the package which is gripped between the active members of the jaws and held between them for a certain time interval during the welding operation being momentarily led along a very curved path, with the consequent application of a vertical shaking movement to the whole wrapper.

The selection of a radius of rotation of the lower jaw of approximately 1.5 times the radius of rotation of the active members of the other jaw has been shown to be particularly suitable for this purpose.

In order to be able to maintain synchronisation between the movement of the two jaws, the selection of the different radii of rotation also involves the selection of a number of different active members of the two jaws. With reference to the ratio between the radii mentioned above, a selection which has been shown to be particularly suitable is that of providing numbers of active members on the two jaws which are in the same ratio to each other as that of the radii. Typically, in the case of a ratio between the radii of 1.5, three active members are mounted on the jaw with the larger radius, whilst the jaw with the smaller radius has two active members.

The pivoted support structure which controls the reciprocating movement of one of the jaws relative to the other preferably has associated drive means able to drive its reciprocating orbital movement at different speeds in respective directions the same as and opposite the direction of transit of the packages through the jaw assembly, with a greater speed during movement in the same direction as the transit of the packages. This movement at different speeds is achieved by the movement of the pivoted support structure through a link mechanism.

BRIEF DESCRIPTION OF THE DRAWINGS

The invention will now be described, purely by way of non-limiting example, with reference to the appended drawings, in which.

DETAILED DESCRIPTION

Figure 1:
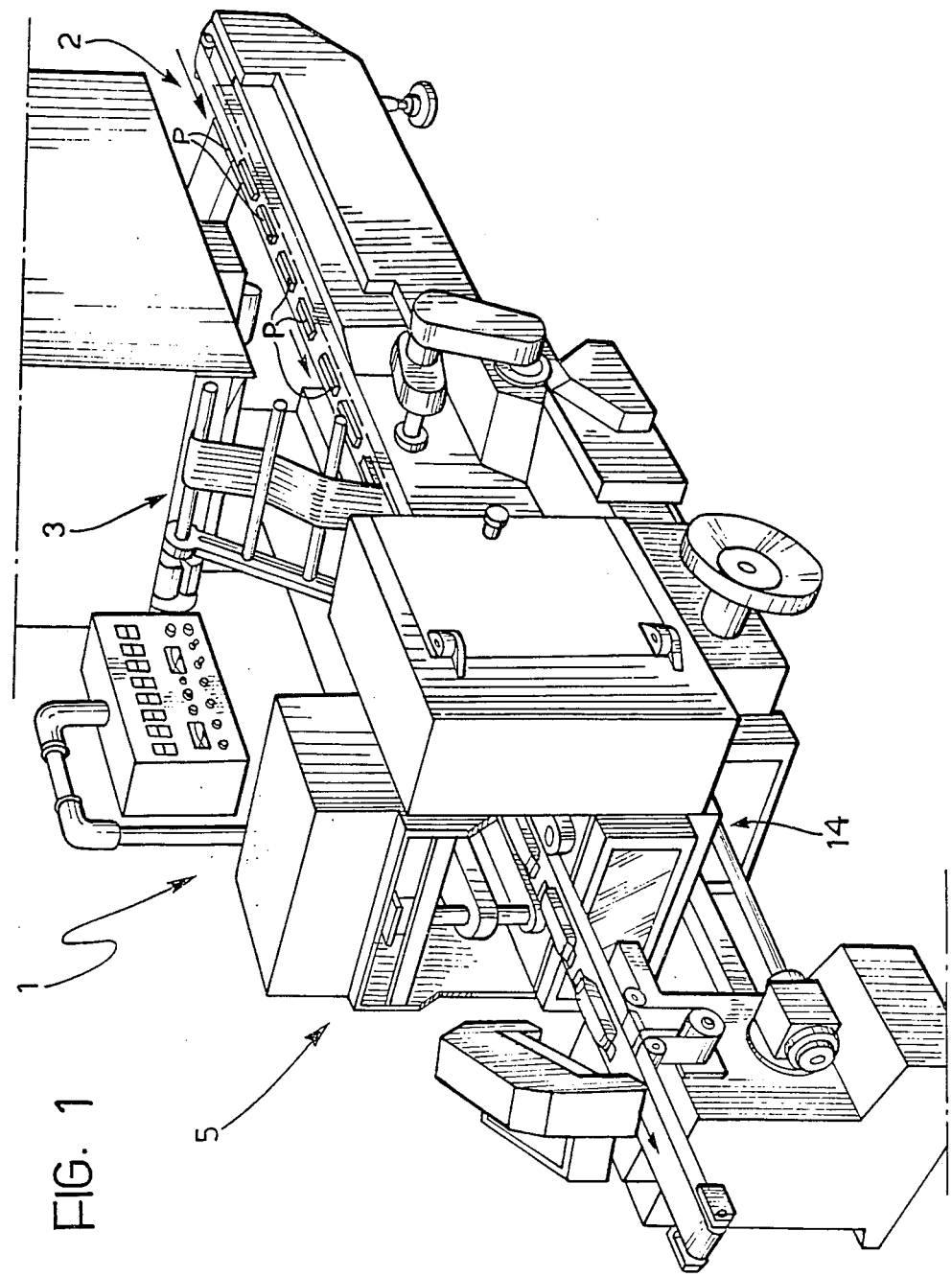
FIG. 1 is a general perspective view of a packaging machine on which a rotary jaw assembly according to the invention is mounted.

FIG. 1 indicates generally a packaging machine 1 for forming packages of the type currently known as "flow-packs", each containing a respective product. The packages are formed from a continuous flow of products P fed into an input end 2 of the machine 1 and from a foil 3 of aluminium or transparent material which is continuously unwound from above.

According to well-known criteria, a continuous tubular wrapper is formed from the foil 3, into which the products P are fed at constant intervals.

The continuous tube is advanced towards a closure station 5 whose function is essentially to flatten the tubular wrapper in the spaces between two consecutive products P, forming sealing zones in these spaces to separate and seal the individual products P. The wrapper is then subjected to a cutting operating in the sealing phase, resulting in the separation of the packages.

The present invention relates in particular to the realization of the closure station 5 of the machine 1.

Figure 2:
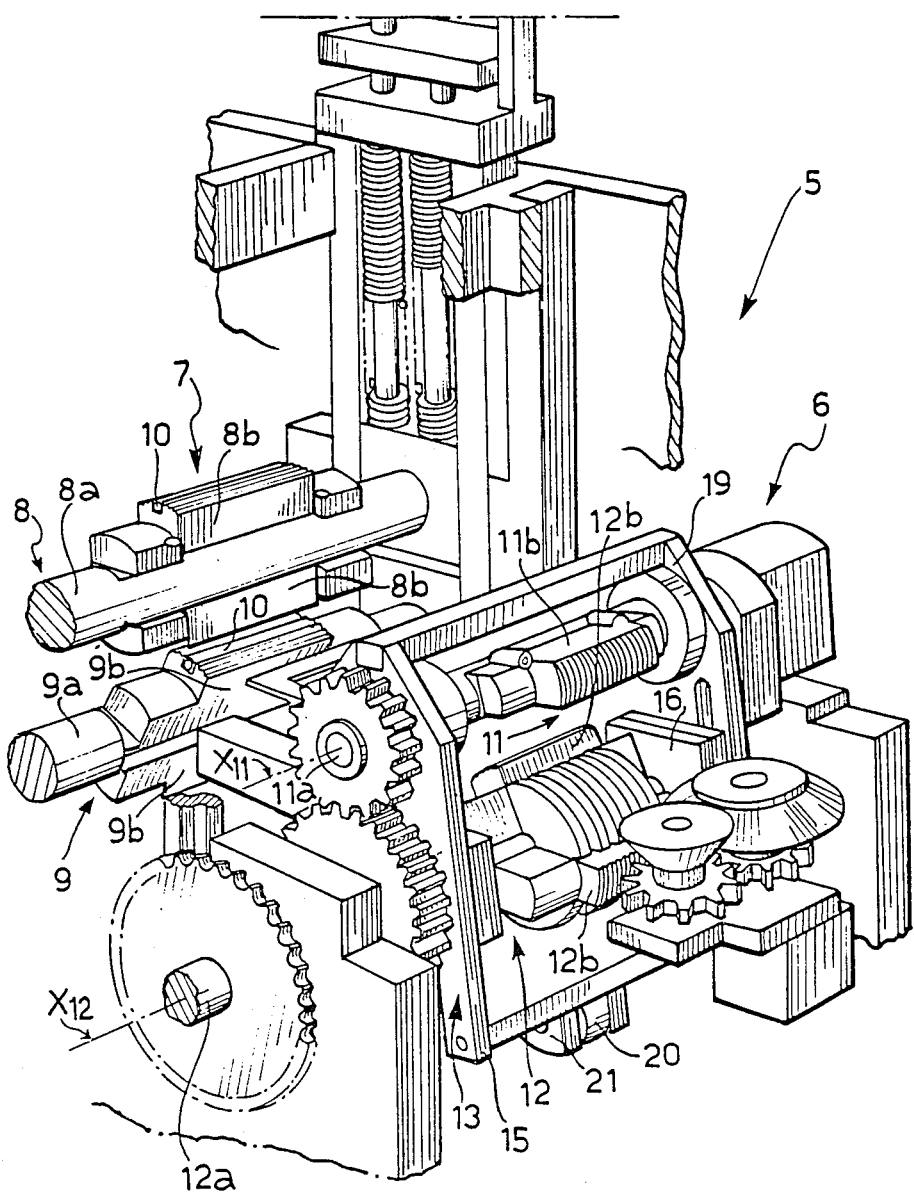
FIG. 2 is a perspective view of a rotary jaw assembly according to the invention, with various parts removed and/or sectioned for clarity.
Figure 3:
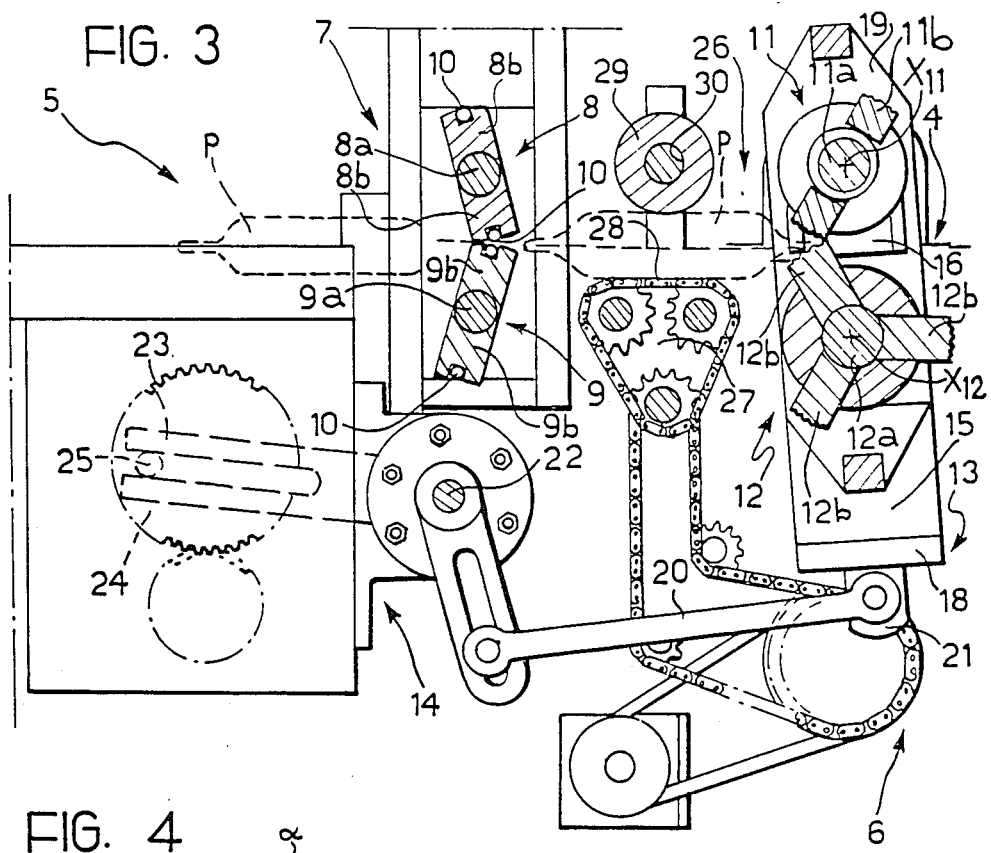
FIG. 3 is an ideal vertical longitudinal section of the assembly illustrated in FIG. 2.

As is best seen in FIGS. 2 and 3 there are two rotary jaw assemblies 6 and 7 at the station 5 disposed upstream and downstream respectively in the direction of advance of the products P through the machine 1.

The downstream assembly 7 is realized according to a conventional solution. It includes two similar rotary jaws, an upper one 8 and lower one 9 respectively.

Each jaw consists essentially of a shaft 8a, 9a which is rotated by drive means (not illustrated) and on which are mounted one or more (two, in the example illustrated) active members 8b, 9b carrying associated heating elements, not illustrated.

In the specific example, both the jaws 8 and 9 are provided with a pair of active members 8b, 9b mounted diameter opposite each other, whose free ends, which are generally rounded and possibly provided with grooves for gripping the wrapper, carry cutting members (blades) 10 which cooperate to cut the sealed region between successive packages formed by the upstream assembly 6 and thus separate the individual packages.

The shafts 8a and 9a are connected together in known manner by a gear mechanism which causes them to rotate in opposite directions. This causes the active members 8b, 9b to orbit in opposite senses, causing one of the active members 8b of the upper jaw 8 to move downwards from time to time to cooperate with an ascending active member 9b of the lower jaw 9, so as to cut the wrapper and separate the two packages. It is for this purpose that the active members 8b and 9b are provided the blades 10. When the latter come into contact with each other they cut the wrapper which has been softened by the effect of the heating elements of the jaws.

The function of the upstream jaw assembly 6, on the other hand, is the prior formation of the sealed region which is cut by the assembly 7. The sealed region is formed by the squeezing of the region of the tubular wrapper between two products P with the simultaneous heating of the wrapper, so as to cause a heat seal between the two parts of the wrapper which are squeezed against each other.

For this purpose, the assembly 6 has an upper jaw 11 and a lower jaw 12 each consisting of a rotary shaft 11a, 12a on which are mounted respective active members 11b, 12b, also with rounded free ends and perhaps grooves for gripping the wrapper.

The upper jaw 11 of the assembly 6 is essentially the same as the jaws 8 and 9 of the assembly 7, with the difference of the possible absence on the jaw 11 (as on the jaw 12) of the blades 10 present on the jaws of the assembly 7.

The active members 11b, 12b of the jaws 11 and 12 are also provided with heating elements (not illustrated) whose purpose is to bring the portions of the active members 11b, 12b which will act on the wrapper to a temperature such as to produce local fusion and consequent sealing of the two parts of the wrapper held between the two jaws 11 and 12 during the sealing operation.

The upper jaw 11 of the assembly 6 has practically the same dimensions as those of the jaws 8 and 9 of the downstream assembly 7.

The lower jaw 12, on the other hand, is provided with active members 12b whose height (measured in a radial direction with respect to the shaft 12a) is greater than that of the active members of the other jaws and of the jaw 11 in particular.

According to a particularly advantageous embodiment, the height of the active members 12b of the jaw 12 is selected so that the circular path along which the free ends of the active members 12b are rotated by the rotation of the shaft 12a is approximately 1.5 times the radius of the corresponding circular path described by the free ends of the active members 11b of the jaw 11.

A selection of dimensions which has been shown to be particularly advantageous is that of a radius of rotation of 5 cm for the upper jaw 11 and a radius of rotation of 7.5 cm for the lower jaw 12.

The lower jaw 11 also differs from the other jaws in the different number of active members 12b selected, which are three in number and are angularly spaced at 120° from each other.

It can immediately be seen that the 3/2 ratio between the number of active members 12b of the lower jaw 12 and the number of active members 11b of the upper jaw 11 corresponds to the ratio of 1.5 between the radii of rotation referred to above.

This selection ensures precise synchronisation between the movements of the active members 11b and 12b, whilst the same angular rates of rotation are maintained for the shafts 11a and 12a. Synchronized movement of the jaws 11 and 12 in opposite directions is also achieved in this case by means of a gear mechanism, not explicitly shown, driven by a main driving shaft.

The possible selection, for the lower jaw 12, of a greater radius of rotation of the active members 12b with respect to that of the other jaws responds to a need better explained below.

As can be seen from FIG. 3, while the jaws 8 and 9 of the downstream assembly 7 are mounted in practically fixed positions with respect to the framework of the machine 1 (save, of course, for the possibility of precise adjustment of the relative positions of the jaws and the possibility of a limited capacity for relative pivoting of the jaws during their movement, in order to avoid jamming), the jaws 11 and 12 of the assembly 6, however, are mounted on the framework 1 with the interposition of a pivoted or swinging support structure 13 moved by a link mechanism 14.

With reference to FIG. 3, an axis which is horizontal (or generally parallel to the axes of rotation of all the jaws of the machine) and about which the structure 13 is able to perform a swinging or pivoting reciprocating motion, as indicated by the double arrow in the drawing, is indicated $X_{12}$. In fact, this axis coincides with the axis $X_{12}$ about which the lower jaw 12 rotates. $X_{11}$, on the other hand, indicates the position, with respect to the structure 13, of the axis of rotation of the jaw 11 supported by the structure 13 itself.

In practice, the structure 13 consists of two side frames 15 mounted on opposite sides of the machine 1 and able to pivot about the axis $X_{12}$.

For example, the two side frames 15 may be arranged astride the shaft 12a or an equivalent member and held in this position by a spring (not shown in the drawings) which acts between the support member and a transverse member 18 mounted at the end of each side frame 15 to connect their two lower free ends.

A screw-and-wedge adjustment device (not shown in the drawings) allows for precise adjustment of the position of mounting of the side frame 15.

It can be seen immediately that, due to the pivoting of the two side frames 15 about the axis $X_{12}$, the upper jaw 11 performs a reciprocating orbital pivoting or swinging movement relative to the lower jaw 12.

Figure 4:
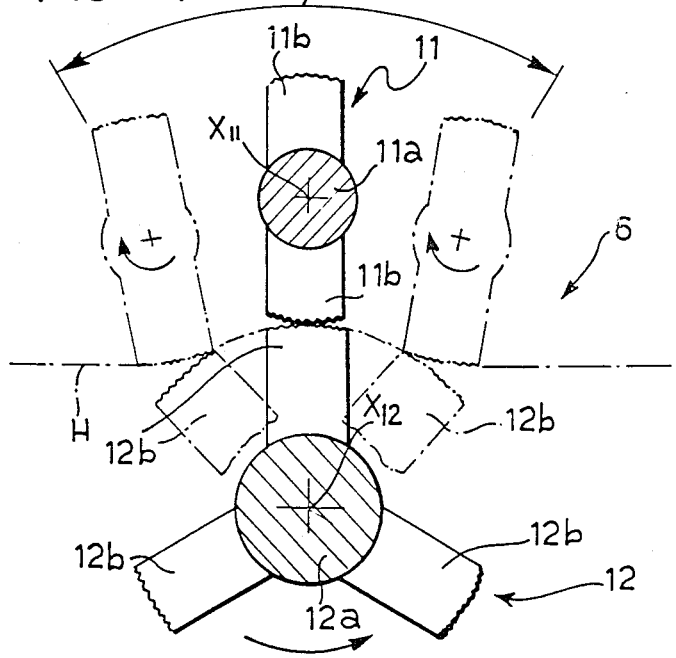
FIG. 4 is another sectional view of the upper right-hand part of FIG. 3 on an enlarged scale, which illustrates the operating principle of a jaw assembly according to the invention.

The diagram of FIG. 4 shows several possible positions assumed by the upper jaw 11 relative to the lower jaw 12 during a swinging movement with an amplitude $\alpha$ of, for example, 60°, with characteristics of symmetry about a vertical plane.

The function of the link mechanism 14, which is connected to the support structure 13 by means of a connecting rod 20 that acts on a bracket 21 projecting from the lower part of the structure 13, is to drive the swinging movement of the structure 13 (and of the jaw 11 relative to the jaw 12) at different speeds in the two directions of swinging.

In particular, the position of mounting of the pivoting shaft 22 and the fork 23 of the linkage, together with the position and direction of rotation of the shaft on which the wheel 24 supporting the operating pin 25 of the linkage is mounted, is selected so that the speed of the forward swinging movement of the structure 13 (that is, the movement in the direction which brings the upper jaw 11 nearer to the cutting assembly 7) is greater than the speed of swinging in the opposite direction.

The swinging movement of the structure 13 is driven at the same frequency as that with which the products P pass through the two jaw assemblies 6 and 7, that is, in correspondence to the speed with which the jaws 11 and 12 are to seal the packages.

With reference, for simplicity, to the case in which the packages are each required to contain a single product P, a complete forwards-backwards swinging cycle of the structure 13 is effected for each product P which is packed.

The purpose of the swinging movement is to allow the upper jaw 11 to "follow" the part of the tubular wrapper between two successive products P so as to be able to remain in contact with it — in all conditions — for a sufficient time interval to allow correct heat-sealing and closure of the wrapper.

In particular, the swinging movement of the structure 13 is synchronized (in known manner) with the rate of rotation of the jaws 11 and 12 so as to achieve, during the formation of each sealing zone, the sequence of relative positions of the active members 11b and 12b of the two jaws schematically illustrated in FIG. 4.

In this Figure for clarity of reference, it can be assumed that the packages move between the two jaws 11 and 12 from right to left, that the upper jaw 11 rotates clockwise, and that the lower jaw 12 rotates anticlockwise.

The swinging movement of the structure 13 is driven in such a way that each active member 11b reaches the initial position of contact with the corresponding active member 12b of the lower jaw 12, to start the sealing operation, exactly when the structure 13 is in the position of rearwardmost swinging (that is, away from the cutting assembly 7), as schematically illustrated by a chain line in the right-hand part of FIG. 4.

By virtue of the rotation of the two jaws 11 and 12, on which the swinging movement of the structure 13 is superimposed, the same active members 11b and 12b continue the sealing operation as they come into the position of vertical alignment illustrated by a solid line in FIG. 4.

As the rotation of the jaws 11 and 12 and the forward swinging movement of the structure 13 continue, the same active members 11b and 12b complete the sealing operation and are finally brought to the position illustrated by broken lines with double dots in the left-hand part of FIG. 4. This is the position in which the structure 13 has reached its position of forwardmost swinging, whilst the two active members 11b and 12b move away from each other, one (11b) upwards and the other (12b) downwards.

At the same time, two other active members are moving, one (11b) downwards and the other (12b) upwards, to come into the closure position on the next part of the wrapper to be closed. The momentary separation of the active members of the two jaws 11 and 12 which occurs at this time allows the produce P inserted in the package to pass between the two jaws 11 and 12 themselves. Also at this time, the structure 13 is swung backwards so as to resume its initial operating position, indicated by chain lines in the left-hand part of FIG. 2.

From this Figure it can be seen that, according to the invention, the wrapper of the package is subjected to the heating and sealing action of the active members of the two jaws 11 and 12 for the whole time interval between the right-hand (chain lines) and left-hand (broken lined with double dots) end positions of FIG. 4.

The duration of this interval depends on the amplitude of the angle $\alpha$ of the pivoting movement of the jaw 11 relative to the jaw 12 and can thus be controlled precisely, whatever the speed of operation of the equipment (frequency of the sealing operation).

During their transit through the jaw assembly 6, the wrappers (or more precisely the parts thereof which are subjected to the sealing operations) follow a path corresponding to that indicated by the chain line H in FIG. 2. This is a path which, in correspondence with the jaw assembly 6, has a generally curved course whose radius is determined by the radius of rotation of the active members 12b of the lower jaw 11.

Since this slightly curved path corresponds to a sort of vertical jerk of the wrapper and the products P, it is advantageous to make the radius of curvature of this curved section as large as possible.

This is achieved by a corresponding increase of the radius of the lower jaw 12, according to the criteria described above.

The use of two rotary jaw assemblies 6, 7 arranged consecutively constitutes a preferred embodiment as far as the quality of the sealing and cutting operation of the packages is concerned.

In the embodiment described, the assembly 6 carries out the sealing operation, whilst keeping secure control of the packages for the whole of the path of the transit of the packages through the assembly. The assembly 7, whilst it can be equipped to carry out a further sealing operation, is generally intended principally to carry out the cutting and separating operation of successive packages.

Naturally, it is also possible to incorporate both the sealing and the cutting functions in a single jaw assembly having the structure of the assembly 6 described above. In this case, it would be necessary to provide cutting members, similar to the members 10 described above with reference to the assembly 7, on the active members 11b and 12b of the two jaws.

In the case where two consecutive jaw assemblies 6 and 7 are used, an assembly 26 for stabilizing the movement of the packages whose ends have already been sealed but not yet cut is preferably interposed between the two assemblies 6 and 7.

In the embodiment illustrated, the assembly 26 comprises a lower member 27 consisting of a motorized chain or belt conveyor with an active pass 28 aligned with the plane of sliding of the packages and an upper member 29 consisting of an idle roller mounted on a horizontal shaft 30.

The function of the motorized conveyor 27 is to guide the products in the already-sealed packages positively between the sealing assembly 6 and the cutting assembly 7.

The function of the roller 29, which usually consists of low-friction material such as polytetrafluoroethylene, is essentially to form an upper containment barrier for preventing excessive bending of the chain of package products between the two assemblies 6 and 7. Preferably, the position of mounting of the shaft 30 and the radius of the roller 29 are selected so that the roller 29 does not normally come into contact with the upper sides of the products, but is confined simply to counteracting abnormal lifting phenomena.

Naturally, the principle of the invention remaining the same, the details of realization and forms of embodiment can be varied widely with respect to those described and illustrated, without thereby departing from the scope of the present invention.

I claim:

1. A rotary jaw assembly for packaging machines, comprising a pair of jaws which together define a transit zone for packages and in which each jaw is provided with at least one active member which rotates about a respective axis so as to cooperate with an active member of the other jaw to cause closure of the packages in a region between the two cooperating active members, wherein said pair of jaws are associated with a common pivoted support structure which imparts to said one of the jaws a reciprocating orbital movement relative to the other jaw, so that said one of the jaws can follow said region in which the packages are closed during transit through the rotary jaw assembly.

2. An assembly according to claim 1, wherein at least one active member of the other jaw has a radius of rotation larger than the radius of rotation of at least one active member of said one of the jaws.

3. An assembly according to claim 2, wherein said active member of the other jaw has a radius of rotation, of approximately 1.5 times the radius of rotation of said active member of said one of the jaws.

4. An assembly according to claim 1 wherein said other jaw has a greater number of active members than said one of the jaws.

5. An assembly according to claim 2 or claim 4, wherein the ratio between the number of active members of the other jaw and the number of active members of said one of the jaws is approximately equal to the ratio between their respective radii of rotation.

6. An assembly according to claim 1 wherein the pivoted support structure has associated drive means able to drive the reciprocating orbital movement at different speeds in respective directions the same as and opposite to the direction of transit of the packages through the rotary jaw assembly, the speed being greater during the pivoting movement in the same direction as the direction of transit through the rotary jaw assembly.

7. An assembly according to claim 6, wherein the drive means comprise a link mechanism.

8. An assembly according to claim 1 comprising first and second pairs of rotary jaws arranged respectively upstream and downstream relative to the direction of transit of the packages, said pivoted support structure being provided only for the first pair of jaws.

9. An assembly according to claim 8, wherein the jaws of the second pair are provided with cutting means for cutting the packages.

10. An assembly according to claim 8 wherein between the first and second pairs of conveyor assembly jaws, there is provided a package conveyor assembly comprising:
   a lower, endless, driven conveyor element with a pass for conveying the packages, substantially aligned with the direction of the transit movement of the packages, and
   an upper conveyor element which is freely rotatable as a result of contact with the packages in transit.

11. A rotary jaw assembly for packaging machines, comprising a pair of jaws which together define a transit zone for packages and in which each jaw is provided with at least one active member which rotates about a respective axis so as to cooperate with an active member of the other jaw to cause closure of the packages in a region between the two cooperating active members, wherein at least one of the jaws has an associated pivoted support structure which imparts to said one of the jaws a reciprocating orbital movement relative to the other jaw, so that said one of the jaws can follow said region in which the packages are closed during transit through the rotary jaw assembly, and wherein at least one active member of the other jaw has a radius of rotation larger than the radius of rotation of at least one active member of said one of the jaws.

12. A rotary jaw assembly for packaging machines, comprising a pair of jaws which together define a transit zone for packages and in which each jaw is provided with at least one active member which rotates about a respective axis so as to cooperate with an active member of the other jaw to cause closure of the packages in a region between the two cooperating active members, wherein at least one of the jaws has an associated pivoted support structure which imparts to said one of the jaws a reciprocating orbital movement relative to the other jaw, so that said one of the jaws can follow said region in which the packages are closed during transit through the rotary jaw assembly, and wherein said other jaw has a greater number of active members than said one of the jaws.

13. A rotary jaw assembly for packaging machines, comprising a pair of jaws which together define a transit zone for packages and in which each jaw is provided with at least one active member which rotates about a respective axis so as to cooperate with an active member of the other jaw to cause closure of the packages in a region between the two cooperating active members, wherein at least one of the jaws has an associated pivoted support structure which can impart to said one of the jaws a reciprocating orbital movement relative to the other jaw, so that said one of the jaws can follow said region in which the packages are closed during transit through the rotary jaw assembly, and wherein the pivoted support structure has associated drive means for driving the reciprocating orbital movement at different speeds in respective directions the same as and opposite to the direction of transit of the packages through the rotary jaw assembly, the speed being greater during the pivoting movement in the same direction as the direction of transit through the rotary jaw assembly.

14. An assembly according to claim 13 in which said pair of jaws are mounted on a common pivoted support structure.

* * * * *

UNITED STATES PATENT AND TRADEMARK OFFICE
CERTIFICATE OF CORRECTION

PATENT NO. : 4,862,673
DATED : September 5, 1989
INVENTOR(S) : Renzo Francioni

It is certified that error appears in the above-identified patent and that said Letters Patent is hereby corrected as shown below:

On the Front Page:

Abstract, line 2, change "machine" to -- machines --.

In the Specification

Column 1, line 37, after "brings" insert -- a --.
Column 1, line 40, before "this" delete "to".

Column 3, line 12, change "aluminium" to -- aluminum --.
Column 3, line 22, change "operating" to -- operation --.
Column 3, line 41, change "diameter" to -- diametrically --.

Column 5, line 23, change "frame" to -- frames --.

Column 6, line 38, change "produce" to -- product --.

Signed and Sealed this

Eighteenth Day of December, 1990

*Attest:*

HARRY F. MANBECK, JR.

*Attesting Officer*   *Commissioner of Patents and Trademarks*